United States Patent
McGinley et al.

[11] Patent Number: 5,969,841
[45] Date of Patent: Oct. 19, 1999

[54] GIGABAUD LINK MODULE WITH RECEIVED POWER DETECT SIGNAL

[75] Inventors: James W. McGinley, Schaumburg; Patrick B. Gilliland, Chicago, both of Ill.

[73] Assignee: Methode Electronics, Inc., Chicago, Ill.

[21] Appl. No.: 08/821,134

[22] Filed: Mar. 20, 1997

[51] Int. Cl.⁶ .................................................. H04B 10/00
[52] U.S. Cl. ........................... 359/163; 359/152; 359/110
[58] Field of Search .............................. 395/651; 370/464, 370/466; 359/158, 163, 127, 110, 152, 143

[56] References Cited

U.S. PATENT DOCUMENTS

| | | | |
|---|---|---|---|
| 4,908,823 | 3/1990 | Haagens et al. | 370/85 |
| 5,069,522 | 12/1991 | Block et al. | 385/39 |
| 5,253,249 | 10/1993 | Fitzgerald et al. | 370/24 |
| 5,727,207 | 3/1998 | Gates et al. | 395/651 |
| 5,727,218 | 3/1998 | Hotchkin | 395/733 |

OTHER PUBLICATIONS

GLM Family Physical, Electrical, & Link Level Specification FCSI–301–Revision 1.0.

Coughlin and Driscoll, Operational Amplifiers and Linear Integrated Circuits, pp. 51, 52, 53 74, 76,118,180 and 181, 1991.

*Primary Examiner*—Kinfe-Michael Negash
*Attorney, Agent, or Firm*—David L. Newman

[57] ABSTRACT

An improved Gigabaud Link Module (GLM) is provided for performing bi-directional data transfers between a host device and a serial transfer medium. The improved GLM, includes data signal transmission circuitry for reading data signals from the host device and transmitting the data signals as serial data over a first serial transfer link. Data signal receiving circuitry is also provided for receiving serial data signals from a second serial transfer link. The receiving circuitry then writes the signals to the host device. The first and second transfer links form the serial transfer medium, and the transmission and receiving circuitry provides the bi-directional data transfer between the host device and the serial transfer medium. The improved GLM further includes signal detection circuitry for determining when data signals are being received over the second serial transfer link.

16 Claims, 5 Drawing Sheets

GIGABAUD LINK MODULE WITH RECEIVED POWER DETECT SIGNAL

BACKGROUND OF THE INVENTION

The present invention relates to an improved Gigabaud Link Module for providing a received signal detected indication incorporated with a link unusable signal supplied to a host device.

Gigabaud Link Modules (GLM) are high speed data modules used for transferring massive amounts of data between various pieces of computer equipment, for example between a host computer and a peripheral storage device such as a disc drive. An individual GLM provides bi-directional communication between the parallel format data bus of a host device and a serial format transfer medium. A pair of GLM can be connected to each end of the transfer medium to create a bi-directional communication link, or multiple GLM can be connected in a daisy-chain manner to establish an arbitrated loop configuration. In either case, a GLM module provides bi-directional communication between its host device and the transfer medium, allowing data to be exchanged between the various host devices associated with each of the GLM connected to the transfer medium.

The GLM family specification, FCSI-301 incorporated herein by reference, describes a series of single port serial communications subassembly modules all having a common footprint and configured to support a variety of data rates, transfer media types, transmission lengths, and interface widths. In accordance with the GLM family specification, GLM can be configured to support a variety of transfer media including: short wave laser using 50 or 62.5 micron multimode optical fiber, long wave laser using single mode fiber, and copper using a variety of media and connectors. A first preferred embodiment of the present invention relates to GLM employing laser generated signals and an optical fiber transmission medium in applications supporting Fibre Channel/Arbitrated loop, Local Area Networks, and other shared resource computing arrangements. A second preferred embodiment is also provided having broader application in GLM supporting any of the available transmission media and connected in either a point-to-point or arbitrated loop configuration.

FIG. 1 shows the block diagram of a GLM including a data received signal according to the first embodiment of the present invention. (The block diagrams of the first embodiment and second embodiment shown in FIG. 4 are the same except that the signal detecting circuitry of the second embodiment receives its input from a different point within the receiving circuitry, and the transmitting and receiving circuitry of the second embodiment may be configured to support transfer media other than optical fiber.) The block diagram shown includes function blocks common to all GLM, as well as signal detecting circuitry unique to the present invention. As noted, GLM can be interconnected in two different configurations, either a point-to-point configuration, or an arbitrated loop network configuration. In the point-to-point configuration GLM operate in pairs, with a single GLM connected to each end of a fiber optic link. The output of the transmit portion of a first GLM is connected to one end of an optical fiber, the opposite end of the fiber is then connected to the receive input of a second GLM. The receive input of the first GLM is connected to a second optical fiber, the opposite end of which is connected to the transmit output of the second GLM. Thus, the first GLM transmits data to be received by the second GLM, and receives data transmitted by the second GLM. A central host device can be set up as a hub supporting a number of fiber optic links in a spoke like fashion such that host devices located at the ends of the spokes can communicate with one another through the central hub.

In the arbitrated loop configuration, like the point-to-point configuration, the output of the transmit portion of a first GLM is connected to one end of an optical fiber, the opposite end of which is connected to the receive input of a second GLM. The transmit output of the second GLM, however, is not connected back to the receive input of the first GLM, but rather to the receive input of a third GLM. The transmit output of the third GLM is connected to the receive input of a fourth GLM, and so on in a daisy-chain fashion around a loop until finally, the transmit output of the last GLM in the arbitrated loop is connected to the receive input of the first GLM, thereby closing the loop.

In either configuration, point-to-point or arbitrated loop, the GLM themselves operate in the same manner. A GLM reads data signals from the parallel data bus of its associated host device, and the parallel to serial converter converts the parallel data into a string of serial data bits which are input into a laser driver. The laser driver drives the output of an optical laser diode which converts the electrical signals into optical signals corresponding to the serial data string output from the parallel to serial converter. The laser radiates the signals through the first optical fiber where they are received by a second GLM connected to the opposite end. On the receiving side, a photo diode receives serial optical signals transmitted by another GLM over a second optical fiber. The photo diode converts the optical signals into a serial string of electrical data signals which are then amplified and input into a serial to parallel converter, or deserializer. The deserializer converts the received serial data into a parallel format and writes the parallel data to the parallel data bus of the host device.

In order to synchronize the signals and organize the data being communicated over the serial data link, the host devices connected to each GLM will be equipped with an interface controller. The interface controller organizes the data, and times the exchange of each byte of data between the host and the GLM. An example of such an interface controller configured to support Fibre Channel communications is the TACHYON™ Fibre Channel Interface Controller produced by Hewlet-Packard. It should be noted that Fibre Channel is a high speed communication protocol specifically adapted to accurately exchange massive amounts of data quickly and without errors. To ensure successful data exchange between the interface controller and the GLM, a number of status and control signals are exchanged between the GLM and the interface controller along with the parallel data signals. Included among these are the E_WRAP and L_UNUSE signals.

E_WRAP is short for enable wrap. The E_WRAP signal is generated by the host's interface controller and enables a data loopback mode in the GLM to check the integrity of the serializer and deserializer circuitry of the GLM. When the interface controller drives this signal true (logic 1) the internal loopback mode is initiated within the GLM. The transmitting laser is shut down, and the interface controller sends test data to the GLM. The parallel test data is input to the parallel to serial converter where it is serialized in the normal manner in preparation for transmission over the serial link. However, rather than being output to the laser driver, the output from the parallel to serial converter is looped back to the serial to parallel converter on the receive side of the GLM. The serial to parallel converter deserializes the data and writes the data to the interface controller where it is checked against the original test data. During this operation the link is unavailable for transmitting real data. L_UNUSE is short for link unusable. The L_UNUSE signal is generated by the GLM and indicates when the link is available to transmit data. Among other conditions, this signal will be set true (logic 1) whenever the E_WRAP signal initiates the loopback function, indicating that the transmit laser has been disabled and the link is unavailable.

GLM configured in the point-to-point configuration can support Open Fiber Control (OFC). In these modules the L_UNUSE signal is also set true while the GLM establishes the integrity of the fiber optic link between two modules. This check is necessary to protect personnel against the damaging effects that high energy short wavelength laser radiation can have on human eyes when viewed directly. OFC ensures that the optical fibers extending between the transmit and receive ports of each GLM are in place and unbroken so that the laser radiation emitted from the laser transmitters is wholly contained within the fibers and therefore cannot be viewed directly by personnel working in the same area as the fiber optic link. OFC verifies the integrity of the optical fiber link by transmitting a low duty cycle test signal from one GLM to the other. If a fiber is broken or disconnected, the low duty cycle test signal escaping from the broken or disconnected fiber will have insufficient power to cause harm if inadvertently viewed by personnel in the area. If the fibers are intact, the second GLM receives the test signal and retransmits the signal back to the first GLM. Proper reception of the test signal at the first GLM indicates that the entire link is intact, and that both GLM may begin transmitting at full duty cycle. The L_UNUSE signal is set true throughout the OFC test procedure.

OFC is not supported in all GLM, including those operating in the arbitrated loop configuration. The daisy-chain interconnection between GLM in an arbitrated loop does not allow a test signal to be transmitted from a first GLM then immediately retransmitted from a second GLM back to the first GLM. In the arbitrated loop configuration, the test signal would have to be transmitted all the way around the loop before being received back at the originating GLM. Without OFC, there is no way to determine the integrity of the fiber optic links between GLM comprising the loop. Because the arbitrated loop GLM cannot verify the integrity of the fiber links, the output power of these modules is limited to an output power level much lower than the output power level allowed for GLM supporting OFC. The output power of non-OFC GLM is held below the threshold which can harm the human eye. With the laser output power maintained below this threshold, the signals can be viewed directly without the threat of injury, eliminating the need for OFC. Eliminating the OFC check frees the L_UNUSE signal from being held true (logic 1) while the integrity of the fibers is being checked.

A problem with the operation of arbitrated loop GLM has been the introduction of false control signals generated from random noise within the receiving circuitry of the GLM when one or more of the optical fibers has been disconnected. Even though the photodiode on the receiving side of the GLM may not be receiving optical signals over the fiber optic link, noise present in the highly sensitive photodiode and preamplifier circuits can generate random bit patterns which are transmitted to the host device through the interface controller. Occasionally the random bit pattern generated by the receiving circuitry will mimic valid Fibre Channel control signals. The interface controller will respond to these false signals according to predetermined rules established by the link protocol, such as for example, the Fibre Channel protocol. The interface controller will send a request to the host device to validate and accept the data. However, since the noise signal generating the request is invalid, the host will fail to validate the data based on higher level error checking functions, such as Cyclic Redundancy Checking (CRC). Requests for validation which are not validated by the host device are counted as elastic store errors by the interface controller. A Fibre Channel link is intended to be an error free data transmission medium. Thus, the interface controller attempts to resolve all data transmission errors. However, when the number of unresolved elastic store errors reaches a certain predetermined limit, the controller assumes there is a critical problem and initiates a higher level system shutdown. The system shutdown will alert the network manager, or some other service personnel that there is a problem with the arbitrated loop network, and that corrective action is required.

Obviously, it is undesirable to shut down the arbitrated loop network because of elastic store errors resulting from noise generated within the GLM, especially when the elastic store errors are generated during periods when the GLM is not actively receiving optical data signals over the transmission link. Therefore, it is desirable to provide a GLM with a received signal detect function which can generate a Signal Detected signal to alert the interface controller when data signals are being received over the fiber optic link. False data signals generated by noise during those periods when a data signal is not being received can be ignored. By ignoring these signals, the number of falsely accumulated elastic store errors can be reduced, as well as the amount of down time on the Fibre Channel network.

The GLM Family Specification does not provide for a signal detected signal to alert the interface controller when optical signals are actually being received over the fiber optic link. Therefore, there is no way to distinguish between valid data signals and noise generated in the GLM's receiving circuitry. Furthermore, the GLM Family Specification explicitly states that the L_UNUSE signal should not be used for this purpose. The primary reason for this restriction is that L_UNUSE must be held true (logic 1) during the entire OFC operation, regardless of whether optical power is actually being received over the fiber optic link. Since all of the interface signals between the interface controller and the GLM have been predefined by the GLM Family Specification, and since the L_UNUSE signal has been unavailable for use as a signal detected signal, this feature has not been included in past GLM. The drawback from not including a received power detect signal in arbitrated loop GLM has been increased numbers of elastic store errors, and an unnecessary increase in the amount of network down time.

SUMMARY OF THE INVENTION

Current generation arbitrated loop GLM are now being produced having laser transmitters which operate at reduced optical output power. The operating output power of these devices is below the power threshold necessary to cause damage to the human eye. With these low power transmitters it is no longer necessary to test the integrity of the fiber optic link before the GLM are allowed to begin radiating signals at full power, since even when viewed directly through the end of a broken fiber link, the signals are not strong enough to be dangerous to the eye. Furthermore, GLM supporting transfer media other than optical fibers do not employ transmitting lasers. Therefore, on these GLM the Open Fiber Control function is not required. Absent the OFC function, it is possible to employ the L_UNUSE signal to provide indication to the interface controller when the GLM is actually receiving data signals over the transmission link. This information allows the interface controller to ignore false control signals generated by noise within the GLM's receiving circuitry when data signals are not being received.

The present invention provides a GLM having circuitry for detecting signals present on the receive link of a GLM. A first embodiment employs optical signal detect circuitry for directly measuring the amount of optical radiation received over a fiber optic link. Received radiation above a certain preset power threshold indicates the presence of an input data signal. Received optical radiation below the preset power threshold indicates the absence of an input data signal. A second embodiment, rather than measuring the optical signal directly, detects the presence of a data signal on the output of a signal amplifier which amplifies the converted electrical signal received over the serial link. The first embodiment has the advantage that it measures the input signal directly at the optical input of the fiber optic link, and is less prone to generating a false power detect signal as a result of noise. However, the first embodiment is limited to those GLM supporting a fiber optic transfer medium. The second embodiment on the other hand, while somewhat more susceptible to noise, can be employed with any transfer medium supported by GLM.

In both embodiments, the signal detecting circuitry provides an output signal which is set true (logic 1) whenever a data signal is being received by the GLM. Logic circuitry combines the Signal Detected signal with the E_WRAP signal and RESET signal to generate a L_UNUSE signal incorporating the traditional functions of the L_UNUSE signal as well as the additional Signal Detected signal. Thus, the L_UNUSE signal will be set true (logic 1) whenever the module is resetting, the wrap function has been enabled, or no data signal is being received over the serial transmission link. Having the L_UNUSE signal configured in this manner allows the interface controller to ignore any false data signals received while L_UNUSE is true (logic 1).

DETAILED DESCRIPTION OF THE PRESENTLY PREFERRED EMBODIMENTS

The present invention is for an improved Gigabaud Link Module (GLM) having a Signal Detected signal incorporated into the L_UNUSE signal thereby allowing a host device to ignore randomly generated noise signals during those periods when the GLM is not receiving data signals over a transmission link.

Figure 1:
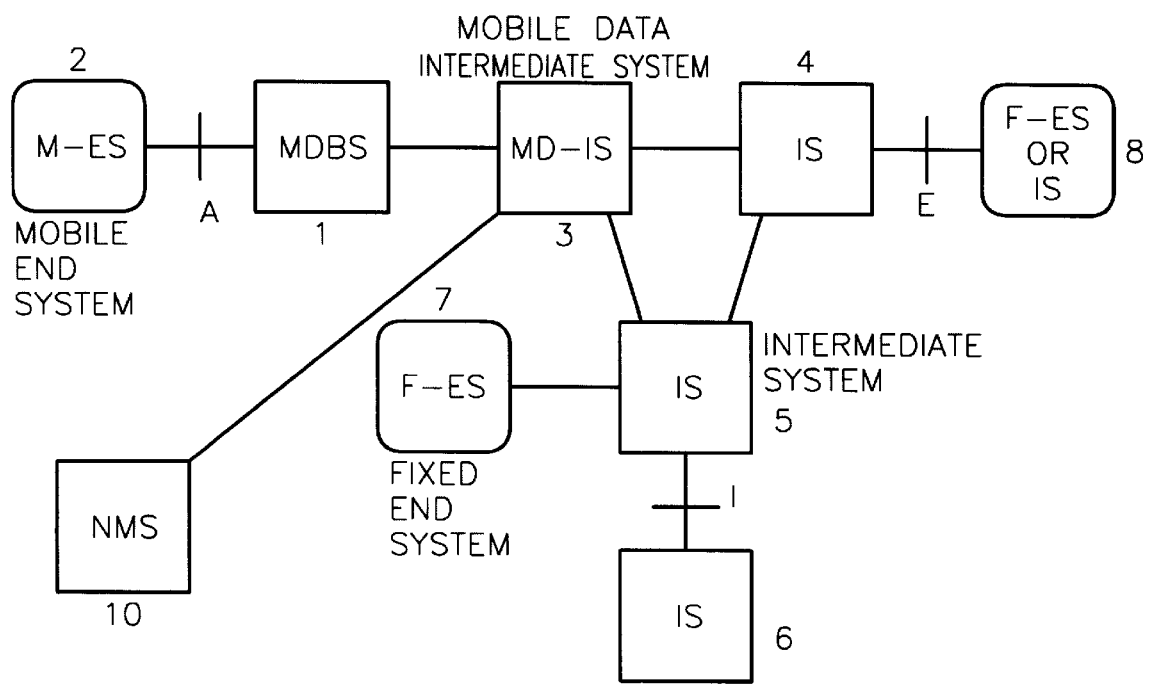
FIG. 1 is a block diagram of a GLM according to a first embodiment of the present invention.

Referring to FIG. 1, an improved GLM 100 according to the first embodiment of the invention is shown in block diagram. The GLM interfaces with the parallel communications bus of a host device 102, and provides a communication link between the host 102 and a pair of serial transfer links 104, 106. In the first embodiment serial transfer links 104, 106 comprise optical fibers. Optical fiber 104 represents a transmit line which conveys optical signals transmitted from GLM 100 to a second GLM (not shown) located at the other end of the fiber. Optical fiber 106 represents a receive line which conveys optical signals transmitted from the second GLM, or possibly a third GLM, depending on the network configuration, to be received by GLM 100.

GLM 100 includes a transmitting section and a receiving section. The transmitting section includes a serializer 108 for converting the parallel data signals of the host communication bus to a serial data string for transmission over the serial link; a laser driver 110 for developing a data transmission signal modulated by the output of serializer 108; biasing circuitry 112; a laser transmitter 114; and back scatter detect circuitry 116. Serializer 108 reads data in twenty bit words from the parallel communication bus of host device 102. Serializer 108 then converts each twenty bit word into a serial data string twenty bits long and outputs the data string to laser driver 110. After completing the serialization of a word, serializer 108 then reads the next word from the bus and repeats the process. As noted, the serial output of serializer 108 is input to laser driver 110 which generates an output signal capable of modulating laser transmitter 114 such that laser transmitter 114 radiates an optical signal corresponding to the serial data output from serializer 108. The output of laser transmitter 114 is coupled to optical fiber 104 such that optical fiber 104 conveys the optical signal radiated by laser transmitter 104 to the second GLM located at the opposite end of the fiber. Bias circuitry 112 provides the proper bias current to laser transmitter 114 to ensure that laser transmitter 114 operates in the proper lasing mode of operation (constant power mode), and back scatter circuitry 116 monitors the output power of the signal being transmitted by laser transmitter 114.

The receiving section of the GLM includes a photodiode 118; an amplifier/line driver 120; a deserializer 122 for converting received serial data strings to twenty bit parallel data words; and received power detection circuitry 124. Photodiode 118 receives optical data signals transmitted by the second GLM, or a third GLM, over optical fiber 106. Photodiode 118 converts the received optical signals into electrical signals comprising a serial string of data bits which can be processed by the GLM. Amplifier/line driver 120 amplifies the electrical data signals developed by photodiode 118, and inputs the amplified signals to deserializer 122. In deserializer 122, the serial data strings received over optical fiber 106 are converted to twenty bit words which are then written to the communication bus of host device 102. The signal detection circuitry 124 monitors optical fiber 106 to determine when optical signals are actually being transmitted over optical fiber 106. An output signal generated by signal detection circuitry 124 indicates that optical power is being received over the fiber optic link. A more detailed description of signal detection circuitry 124 is given below.

The GLM further includes control logic 126 for synchronizing the operation of the GLM with the host device, and for generating certain status signals indicating the mode of operation of the GLM. Included among the signals generated by control logic 126 is the L_UNUSE signal which is discussed in more detail below.

Figure 2:
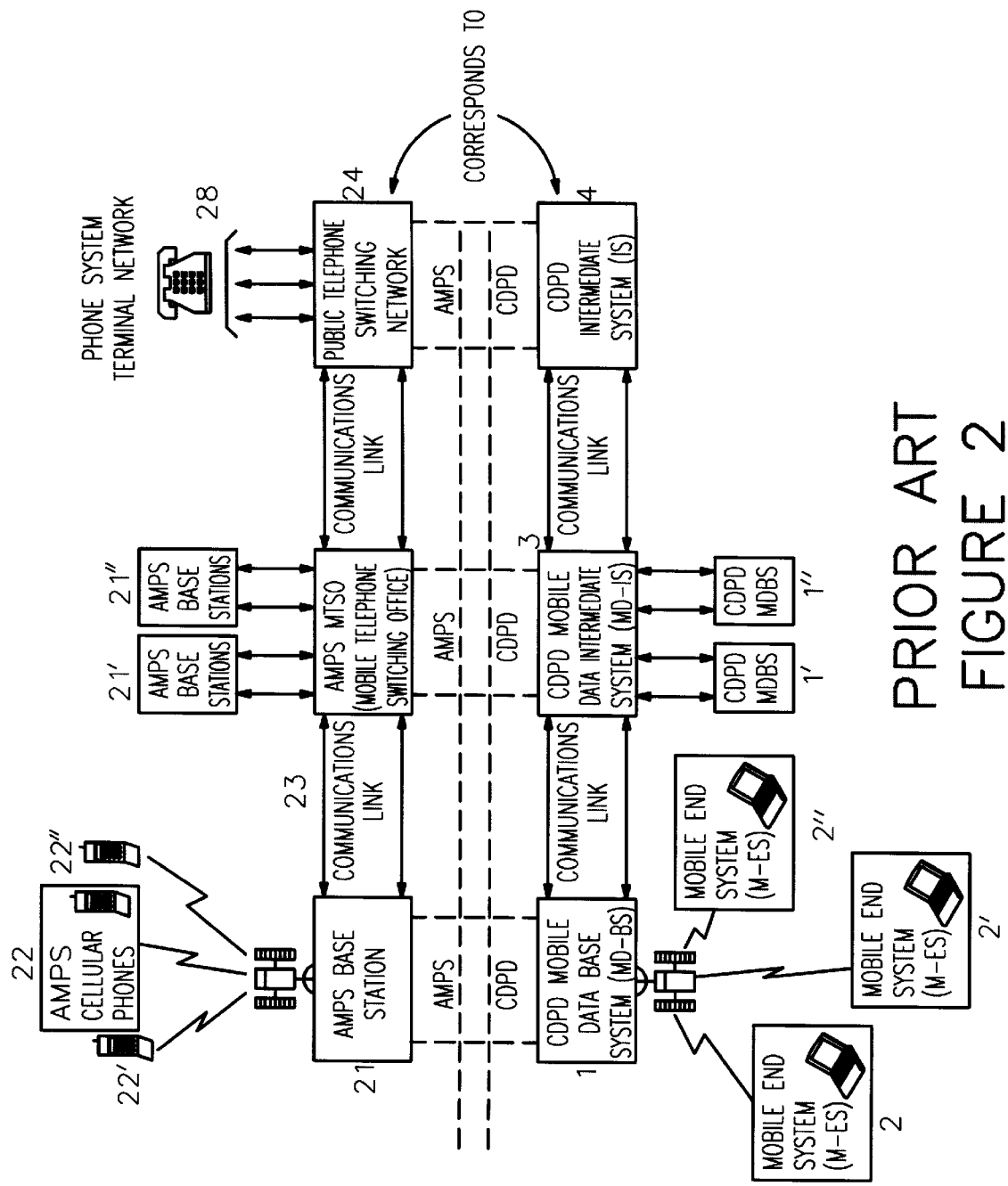
FIG. 2 is a schematic diagram of the signal detect circuitry of the first embodiment of the invention.

Referring now to FIG. 2, a schematic diagram of the signal detection circuitry according to the first embodiment of the invention is shown 200. Signal detection circuitry 200 includes a photodiode 202 (photodiode 202 is actually the same photodiode as 118 in FIG. 1, which functions as both an optical signal receiver and signal detector), a voltage comparator 204, and resistors $R_1$–$R_7$. Resistors $R_3$ and $R_4$ are connected in series between a +5V voltage source and ground, creating a voltage divider between $R_3$ and $R_4$. The junction between $R_3$ and $R_4$ is connected to the non-inverting input of comparator 204. Thus, a reference voltage $V_{REF}$ is established based on the voltage drop across $R_3$ and input to comparator 204. It is preferred that, $R_3$=274Ω, and $R_4$=220KΩ, establishing a voltage drop $V_{REF}$ equal to 6.22 mV across $R_3$. As will be shown below, $V_{REF}$ establishes the power threshold of a received optical signal above which received power detection circuitry 200 will indicate that a signal is present. This power threshold may be altered as desired by altering the resistance ratio between $R_3$ and $R_4$, thereby establishing a different $V_{REF}$.

$R_1$, photodiode 202, and $R_2$ are also connected in series between the +5V voltage source and ground as shown. Photodiode 202 is connected between $R_1$ and $R_2$ with the cathode connected to $R_1$ and the anode connected to $R_2$. The +5V source reverse biases photodiode 202, and the optical radiation received over the receive optical fiber 106 (see FIG. 1) modulates the reverse current allowed to pass through photodiode 202. Thus, the amount of current flowing through $R_1$ and $R_2$ is regulated by photodiode 202. Photodiode 202 is sized such that the reverse current through photodiode 202 varies on the order of 0.5 A per watt of received optical energy. Since the reverse current is dependent on the amount of optical power detected, the reverse current can be considered the signal detect current, or $I_D$. Since photodiode 202 is the only device connected to $R_1$, the reverse current $I_D$ is the only current flowing through $R_1$. Therefore, the current $I_D$ creates a signal detect voltage drop $V_D$ across $R_1$, and since $I_D$ varies according to the amount of optical power received by photodiode 202, $V_D$ likewise varies according to the amount of optical power received. The junction between $R_1$ and the cathode of photodiode 202 is connected to the inverting terminal of comparator 204 through resistor $R_5$. Since the input resistance to comparator 204 is theoretically infinite, the current flowing through $R_5$ is negligible, and consequently there is little or no voltage drop across $R_5$. Thus, the voltage present at the inverting terminal of comparator 204 is approximately equal to the voltage drop $V_D$ across $R_1$. $R_5$ is merely added to reduce the amount of high frequency noise being coupled to photodiode 202. Since the voltage present at the inverting terminal of comparator 204 is approximately equal to the voltage drop $V_D$ across $R_1$, and the voltage present at the non-inverting terminal of comparator 204 is the voltage drop $V_{REF}$ across R3, comparator 204 operates to compare the two voltage drops $V_D$ and $V_{REF}$.

Power detection circuitry 200 further includes an output stage for developing a logic output signal, Signal Detected, indicating that an optical signal has been detected. The output stage includes the output of comparator 204 and pull up resistor $R_7$. Pull up resistor $R_7$ is connected between the +5V supply voltage and the output of comparator 204. In operation, comparator 204 compares the voltage drop $V_D$ across $R_1$ against the voltage drop $V_{REF}$ across $R_3$. When the voltage drop $V_D$ across $R_1$ is greater than the voltage drop $V_{REF}$ across $R_3$, the voltage present at the inverting terminal of comparator 204 will be at a lower potential than the non-inverting terminal. This corresponds to a "true" state. Comparator 204 will be non-conducting, and the output terminal of comparator 204 will be "pulled up" to the +5V supply voltage through resistor $R_7$. When the voltage drop $V_D$ is less than the voltage drop $V_{REF}$, the voltage present at the inverting terminal of comparator 204 will be at a higher potential than the non-inverting terminal. This corresponds to a "false" state. Comparator 204 will become conducting, and the output terminal of comparator 204 will be pulled down to ground potential. Thus, employing positive referenced TTL logic, a +5V true (logic 1) signal is output from signal detect circuitry 200 when the voltage drop $V_D$ is greater than the voltage drop $V_{REF}$, indicating that optical power is being received. Conversely, when the voltage drop $V_D$ is less than the voltage drop $V_{REF}$, a 0V false (logic 0) signal is output from signal detect circuitry 200, indicating that optical power is not being received. Feedback resistor $R_6$ provides hysteresis to prevent output chatter from comparator 204 when the input voltage $V_D$ nears the threshold voltage $V_{REF}$.

As noted, $V_{REF}$, is established by a voltage divider between $R_3$ and $R_4$. In the preferred embodiment, $R_3$ and $R_4$ are sized such that $V_{REF}$=6.22 mV. Thus, the Signal Detected signal will be true (logic 1) whenever the voltage drop $V_D$ across $R_1$ is greater than 6.22 mV. Conversely, the Signal Detected signal will be false (logic 0) whenever $V_D$ is less than 6.22 mV. 6.22 mV represents the threshold voltage $V_{TH}$ for determining whether or not optical power is being received over optical fiber 106.

Since the voltage drop $V_D$ across $R_1$ is determined by the current $I_D$, it is possible to calculate the threshold current $I_{TH}$ which must flow through $R_1$ in order to develop the threshold voltage $V_{TH}$ necessary to generate a true (logic 1) Signal Detected signal. Applying Ohm's law, $I_D$=$R_1$/$V_D$. At the threshold point, $V_D$=$V_{TH}$=6.22 mV, and since $R_1$=1KΩ, $I_{TH}$=6.22 mV/1KΩ=6.22 μA. Knowing $I_{TH}$ it is possible to determine the threshold power $P_{TH}$ which must be received over optical fiber 106 to generate a true Signal Detected output. The current $I_D$ varies as 0.5 A/W of received power, $P_{TH}$=$I_{TH}$/0.5, or $P_{TH}$=6.22 μA/0.5=12.5 μW. Therefore, the Signal Detected output will be true (logic 1) whenever 12.5 μW of optical power are received over optical fiber 106. 1 mW represents a full power or 0 dbm optical signal, therefore, $P_{TH}$ represents a signal −19 dbm below full power. Any signal received less than −19 dbm will cause a false (logic 0) Signal Detected output, any signal received greater than −19 dbm will cause a true (logic 1) Signal Detected output.

Figure 3:
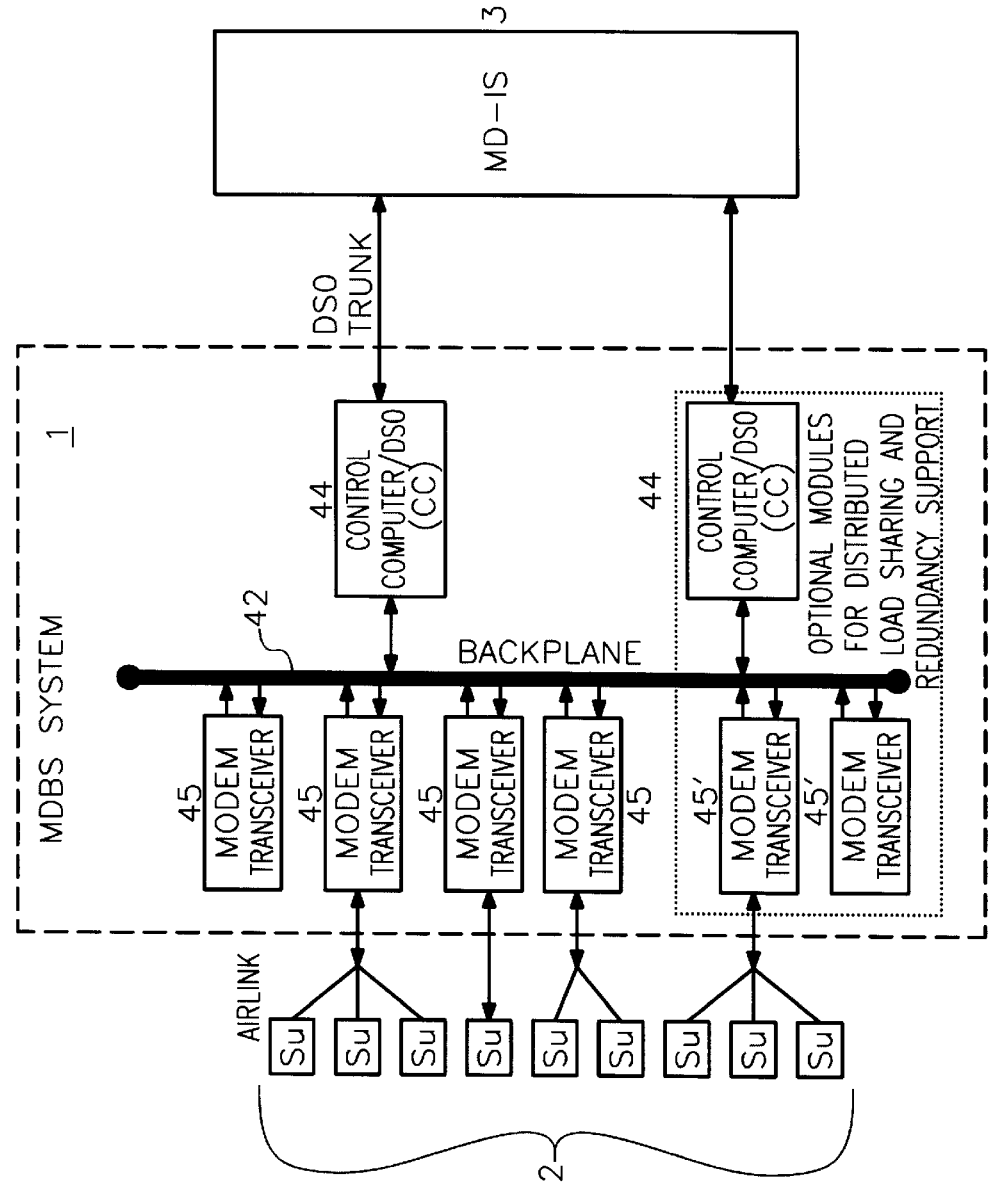
FIG. 3 is a schematic diagram of logic circuitry for generating the L_UNUSE signal including the Signal Detected signal.

Referring now to FIG. 3, control logic 300 is shown for developing the L_UNUSE signal to be output from the GLM to the host device to indicate when the link is available and receiving data. As can be seen from the drawing, the L_UNUSE signal is dependent on three input signals: RESET, an internal signal generated within the GLM to indicate the status of the module, the RESET signal will be true (logic 1) when the GLM is properly installed and the +5V power is correctly applied; E_WRAP, a signal supplied by the host enabling the internal data loopback function as previously discussed; and the Signal Detected signal developed within the GLM as described above.

Control logic 300 includes a series of four cascaded dual input NAND gates 302, 304, 306 and 308. The E_WRAP signal is connected to both inputs of NAND gate 302, thus the output of NAND gate 302, signal 310, is simply the inverted E_WRAP signal $\overline{\text{E\_WRAP}}$ 310. The $\overline{\text{E\_WRAP}}$ signal 310 is then connected to one input of NAND gate 304, and RESET is connected to the other. In this configuration, the output of NAND gate 304, signal 312, will be true (logic 1) for all combinations of $\overline{\text{E\_WRAP}}$ and RESET except for the case when both $\overline{\text{E\_WRAP}}$ and RESET are both high. The false (logic 0) state of signal 312 corresponds to the condition when the GLM module is ready to operate, and the wrap function has not been enabled. Signal 312 acts as the LD_ENABLE signal which enables the laser transmitter diode 114 (see FIG. 1) allowing the GLM to begin transmitting data. Signal 312 is also connected to both inputs to NAND gate 306. Thus, NAND gate 306 acts as an inverter, inverting the LD_ENABLE signal. In other words, the output of NAND gate 306, signal 314, will be false (logic 0) when ever the laser transmitter of the GLM is enabled, and will be true (logic 1) whenever the laser diode is disabled. The output of NAND gate 306, signal 314, is connected to one input of NAND gate 308, and the Signal Detected signal is connected to the other input. The output of NAND gate 308 corresponds to the L_UNUSE signal. With this input arrangement, the L_UNUSE signal will be true (logic 1) for all combinations of signal 314 and Signal Detected except the condition where both signals are true (logic 1). In this condition the L_UNUSE signal will be False (logic 0). The condition where L_UNUSE is false (logic 0) corresponds to the situation where the laser diode is enabled (GLM in condition to transmit data) and the Signal Detected signal indicates that data is being received by the GLM over the receive line 106 (FIG. 1).

With the L_UNUSE signal being controlled in the manner described above, the GLM is supplying a signal to the host device which indicates when the module is both ready for use and receiving data signals over the data link. A true (logic 1) L_UNUSE signal indicates that that the link is not ready, or that no optical signals are being received. Thus, the host can ignore any data received from the GLM while the L_UNUSE signal is true, eliminating the accumulation of elastic store errors that are merely the result of noise generated by the receiving circuitry of the GLM while GLM is not receiving data signals.

Figure 4:
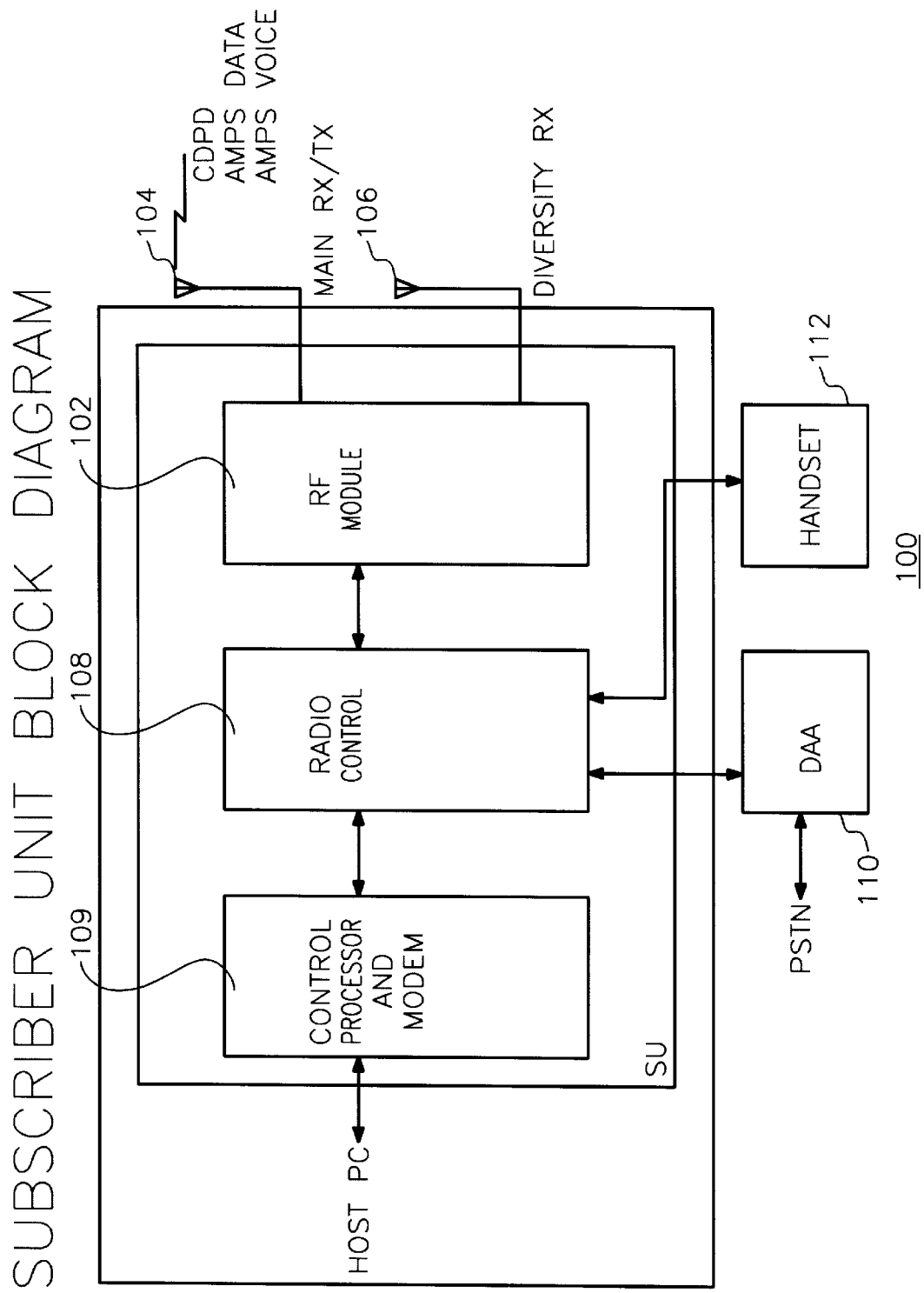
FIG. 4 is a block diagram of a GLM according to a second embodiment of the invention.
Figure 5:
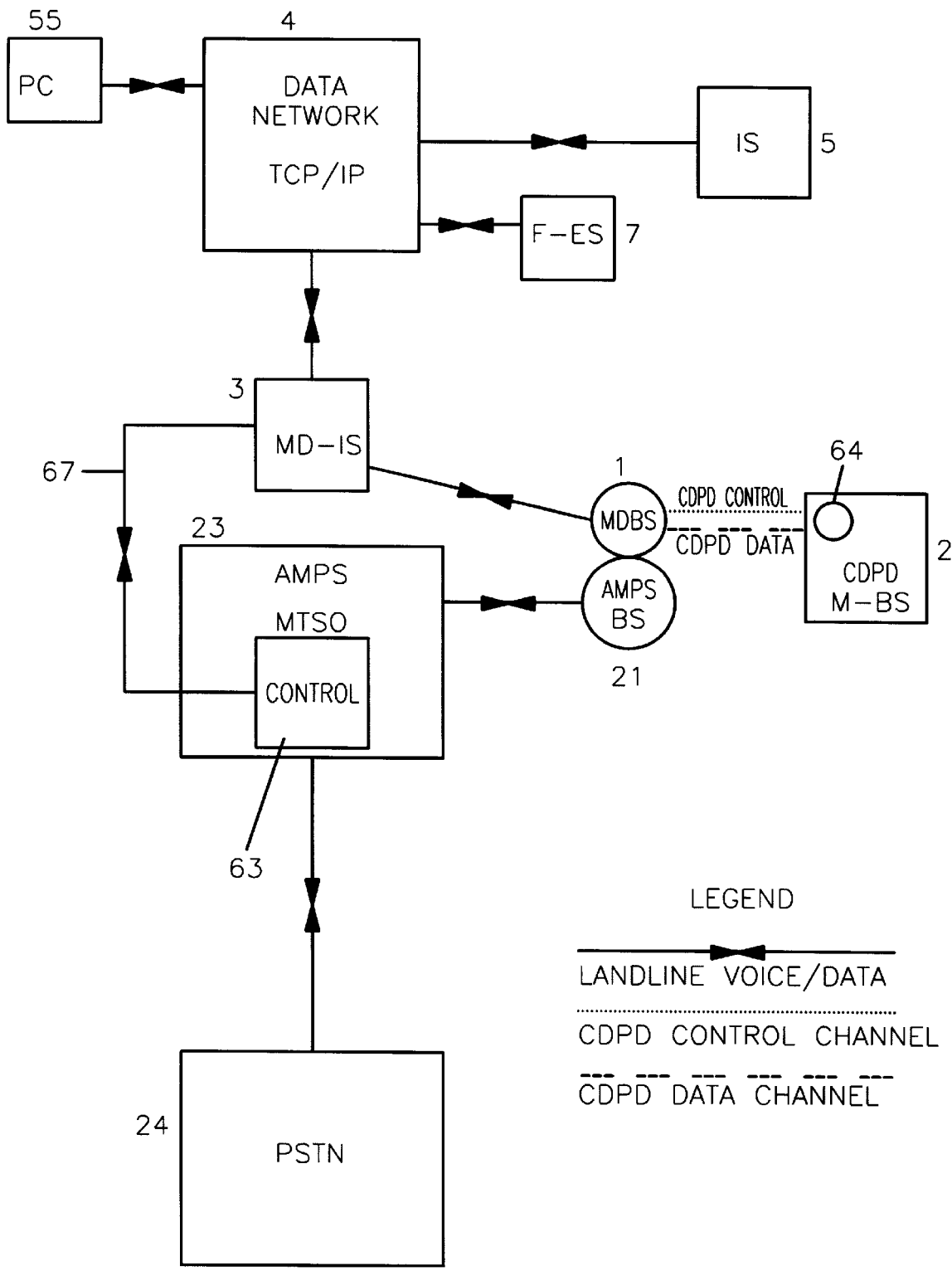
FIG. 5 is a schematic diagram of the signal detect circuitry of the second embodiment of the invention.

A second embodiment of the invention is disclosed in FIGS. 4 & 5. With only a few exceptions, the block diagram of the second embodiment shown in FIG. 4 is identical to that of the first embodiment (see FIG. 1). On the transmit side, since the transfer medium may or may not be an optical fiber, the laser diode 114, bias circuitry 112, and back scatter circuitry 116 of FIG. 1 have been replaced with the more generic transmit circuitry 115 which is intended to encompass any transmit circuitry necessary to drive the particular transmission medium of the particular application. The laser driver 110 has been replaced with the broader line driver 111 as well. On the receiver side, photodiode 118 has been replaced with signal receiving circuitry 119, and the signal detection circuitry 124' of the second embodiment receives its input from the output of the amplifier/line driver 120 rather than the signal receiving circuitry as in the first embodiment. Because the signal detection circuitry 124' of the second embodiment receives its input from the output of amplifier/line driver 120 rather than the signal receiving circuitry 119, alternate circuitry for detecting the presence of an incoming signal on the serial data link is necessary. As with the first embodiment, the Signal Detected signal is input to control logic 126 where it is used to generate the L_UNUSE signal.

Referring now to FIG. 5, a schematic diagram of alternate signal detect circuitry is shown 500. Like the signal detect circuitry of the first embodiment, signal detect circuitry 500 employs a comparator 504 to compare the received data signal against a reference signal and generates an output signal, Signal Detected, based on the results of that comparison. As noted, however, signal detect circuitry 500 receives its input from the output of amplifier/line driver 120 rather than the signal receiving circuitry 119 (see FIG. 4). Amplifier/line driver 120 produces an output data signal having a +3.6 volt dc component with the associated data signal generated by signal receiving circuitry 119 superimposed thereon. The data signal has a peak to peak voltage of 1.2V such that, when superimposed on the +3.6V dc component, data signal binary 1's correspond to a signal voltage of +4.2V, and data signal binary 0's correspond to a signal voltage of +3.0V.

As is clear in FIG. 5, signal detect circuitry 500 immediately splits the data signal output from amplifier/line driver between two separate circuit paths which lead to the non-inverting and inverting terminals of comparator 504 respectively. The first circuit path, connected to the non-inverting terminal of comparator 504 includes resistor $R_{10}$, diode $D_1$, capacitor $C_1$, and resistor $R_{11}$. The second circuit path, connected to the inverting terminal of comparator 404 includes resistors $R_{12}$, $R_{13}$, and $R_{14}$, capacitor $C_2$, diode $D_2$, and $R_{14}$. The first circuit path acts as a peak detector. $R_{10}$ serves to isolate the output of amplifier 120 from the signal detect circuitry 504. Diode $D_1$, capacitor $C_1$, and Resistor $R_4$ form the peak detection circuitry. As the voltage of the data signal from amplifier/line driver increases, $D_1$ is forward biased and $C_1$ rapidly charges to the voltage level of the incoming signal minus the forward voltage drop across $D_1$ (in the preferred embodiment, $D_1$ is selected to have a forward voltage drop of approximately 0.41V). Once the incoming signal reaches its peak voltage and starts to decline, the voltage stored in capacitor $C_1$ becomes greater than the voltage of the incoming signal, reverse biasing $D_1$. With $D_1$ reverse biased, $C_1$ is forced to discharge through $R_{11}$.

According to the protocol governing the communication signals between GLM, any given serial data string transmitted over the serial transfer medium will never contain more than five consecutive binary zeroes without a binary one being interposed therebetween. The data rate of the input signal is 1.063 GHz, such that the period of each bit is 941 pS. Therefore, the total time required to receive 5 consecutive zeroes will be no greater than 5×941 pS or 4.5 nS. In other words, a binary 1 will be received, and the input signal voltage will reach its peak voltage, thereby fully charging $C_1$, at least once ever 4.5 nS. $C_1$ and $R_{11}$ are sized such that the time constant $C_1 R_{11}$ is much greater than 4.5 nS. Therefore, when a data signal is present, capacitor $C_1$ will only discharge a negligible amount when binary zeroes are received and before the capacitor voltage is recharged by the next received binary 1, and thus, when a data signal is present the voltage signal present at the non-inverting terminal of comparator 504 will equal the peak voltage of the incoming data signal minus the 0.41V forward voltage drop across $D_1$. When no data signal is present, capacitor $C_1$ will eventually discharge through $R_4$, and the voltage at the non-inverting terminal of comparator 404 will equal the +3.6 Vdc output of amplifier 120 minus the 0.41V forward voltage drop across $D_1$.

The second circuit path connecting the data signal output of amplifier/line driver 120 to the inverting terminal of comparator 404 determines the average value of the data signal output from amplifier/line driver 120, and provides a voltage reference against which the peak signal voltage detected in the first circuit path is compared. Within the second circuit path, resistor $R_{12}$ serves a number of important functions. First, as with $R_{10}$, $R_{12}$ acts to isolate the output of the amplifier from the signal detect circuitry 504. Second, in combination with capacitor $C_2$, $R_{12}$ forms a low pass filter. $R_{12}$ and $C_2$ effectively block the high frequency data signal and allow only the +3.6 Vdc component of the amplifier/line driver output to pass. Finally, $R_{12}$ forms a voltage divider with $R_{13}$ between a +5V dc supply voltage and the amplifier output. Since $R_{12}$ and $C_2$ filter out the AC signal, $R_{12}$ and $R_{13}$ form a voltage divider between the +5V supply and the +3.6 Vdc component of the amplifier output. The junction of $R_{12}$ and $R_{13}$ acts at the input to the remainder of the circuit. The effect of the voltage divider between $R_{12}$ and $R_{13}$ is to provide an offset voltage or boost to the dc voltage signal output from amplifier/line driver, increasing the voltage of the signal above the +3.6V average value output from the amplifier/line driver.

Diode $D_2$ is included to provide an identical forward voltage drop in the average value signal as that caused by diode $D_1$ in the peak detection circuit. By providing an identical voltage drop, comparator 404 can make a true comparison between the relative values of the peak detect signal of the first circuit path and the offset voltage of the average value signal of the second circuit path since they both will have been reduced by the identical 0.41V forward voltage drop across diodes $D_1$ and $D_2$. The diodes $D_1$ and $D_2$ are an unconnected pair of identical diodes contained in a single package. The two diodes have the same electrical characteristics, and since they are packaged together as a unit, they will react in the same way to thermal changes in their surroundings, creating an equal voltage drop in each of the signals passing therethrough. Identical 475KΩ resistors are provided in $R_{11}$ and $R_{14}$ so that both signals are forward biased in the same manner.

As noted, the first circuit path supplies a voltage signal to the non-inverting terminal of comparator 504 equal to the peak voltage of the input data signal minus the forward voltage drop across $D_1$. The second circuit path supplies a voltage signal to the inverting terminal of comparator 504 equal to the average voltage of the input data signal plus the offset voltage supplied by the voltage divider $R_{12}$ and $R_{13}$, and minus the forward voltage drop across $D_2$. The offset voltage supplied by the voltage divider between $R_{12}$ and $R_{13}$ provides a threshold voltage for determining whether a data signal is being received by the GLM. Comparator 404 compares the peak voltage signal present on the non-inverting terminal against the offset average voltage signal present at the inverting terminal. A voltage signal present at the non-inverting terminal greater than the voltage signal present at the inverting terminal corresponds to a "true" state indicating that a data signal is being received by the GLM. Conversely, a voltage signal present at the non-inverting terminal below the voltage signal present at the inverting terminal, corresponds to a false state, indicating that a data signal is not being received by the GLM. Thus, a data signal is detected when the peak voltage detected is greater than the average value of the data signal plus the voltage offset supplied by the voltage divider between $R_{12}$ and $R_{13}$.

The output stage of signal detect circuitry 400 includes the output of comparator 400 and pull up resistor $R_{15}$. $R_{15}$ is connected between the comparator output and a +5V supply voltage. In the "true" state, when the voltage present at the non-inverting terminal of comparator 504 is greater than the voltage on the inverting terminal (indicating that a signal has been detected), comparator 504 is non-conducting and the output is pulled up to the +5V supply voltage through the 1KΩ $R_{16}$. On the other hand, in the false state, when the voltage present at the non-inverting terminal of comparator 504 is less than the voltage on the inverting terminal, (indicating that a signal has not been detected), comparator 504 becomes conductive, pulling the comparator output to ground. $R_{15}$ provides hysteresis to prevent output chatter from comparator 504 when the peak voltage signal present at the non-inverting terminal of the comparator nears the offset voltage threshold present on the inverting terminal of the comparator. In this way a +5v TTL logic signal SIGNAL DETECTED is developed, generating a true (logic 1) signal when a data signal is received by the GLM and amplified by the amplifier/line driver, and generating a false (logic 0) signal when no data signal is received.

As with the first embodiment, the SIGNAL DETECTED output of signal detection circuitry 500 is input into control logic 126 where it is combined with the other signals to create the L-UNUSE signal as previously described.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A Gigabaud Link Module for performing bi-directional data transfers between a host device and a serial transfer medium, said Gigabaud Link Module comprising:

data signal transmission circuitry for reading data signals from said host device and transmitting said data signal as serial data signals over a first serial transfer link;

data signal receiving circuitry for receiving serial data signals from a second serial transfer link, and writing said signals to said host device;

said first and second transfer links forming said serial transfer medium, and said transmission circuitry and said receiving circuitry providing said bi-directional data transfer between said host device and said serial transfer medium;

signal detection circuitry for determining when data signals are being received over said second serial transfer link; and control logic for producing an L__UNUSE signal for indicating to said host device when said Gigabaud Link Module is operable and said signal detection circuitry has detected an optical signal on said second serial transfer link.

2. The Gigabaud Link Module of claim 1 wherein said first and second serial transfer links comprise first and second optical fibers, and said signal detection circuitry comprises optical signal detection circuitry.

3. The Gigabaud Link Module of claim 2 wherein said optical signal detection circuitry includes optical power measuring circuitry for measuring the optical power received over said second optical fiber, and wherein said optical signal detection circuitry determines that a signal is present when said received optical power exceeds a predetermined power threshold.

4. The Gigabaud Link Module of claim 3 wherein said optical signal detection circuitry comprises a reverse biased photodiode, said photodiode having a reverse current flowing therethrough, and being positioned such that said received optical data signals strike said photodiode, modulating said reverse current whereby said reverse current increases proportionally with the received power of said received optical data signals.

5. The Gigabaud Link Module of claim 4 wherein said photodiode is serially connected to a first resistor between a supply voltage and ground, said first resistor and said photodiode forming a first junction therebetween such that said reverse current flows through said first resistor causing a first voltage drop thereacross, said first voltage drop being proportional to the power of said received optical data signals.

6. The Gigabaud Link Module of claim 5, wherein said optical signal detection circuitry further comprises:

second and third resistors connected in series between said supply voltage and ground, said series connection forming a second junction located between said second and third resistors, said second and third resistors forming a voltage divider wherein a reference voltage drop is created across said second resistor; and means for comparing said first voltage drop with said reference voltage drop, said comparing means providing an output indicating when said first voltage drop exceeds said reference voltage drop.

7. The Gigabaud Link Module of claim 6, wherein said means for comparing comprises a comparator having an inverting terminal, a non-inverting terminal, and an output terminal, said second junction being connected to said non-inverting terminal, and said first junction being connected to said inverting terminal such that said first voltage drop is compared against said reference voltage drop, a pull up resistor is connected between said voltage supply and said comparator output terminal such that when said first voltage drop exceeds said reference voltage drop, said comparator output is pulled up to approximately the same voltage as said supply voltage, when said reference voltage drop exceeds said first voltage drop said comparator output is pulled down to approximately ground potential.

8. The Gigabaud Link Module of claim 1 wherein said control logic comprises:

a reset input, indicating the status of said Gigabaud Link Module;

a test enable input, indicating that a diagnostic test function has been initiated within said Gigabaud Link Module;

a signal detected input generated by said signal detection circuitry; and a control logic output producing said link unusable signal, said control logic output being set to a logical true state for all logical combination of said reset, test enabled, and signal detected inputs, other than the condition when said reset input is logically true, said test enabled input is logically false, and said signal detected input is logically true.

9. The Gigabaud Link Module of claim 8 wherein said signal detection circuitry comprises electrical signal detection circuitry.

10. The Gigabaud Link Module of claim 9 wherein said electrical signal detection circuitry comprises:

a comparator;

peak detection circuitry for generating a peak value signal having a voltage corresponding to the peak value of an input data signal, said peak value signal being connected to the non-inverting terminal of said comparator;

average value circuitry for generating a voltage signal corresponding to the average value of said input data signal; and offset voltage circuitry for boosting the voltage signal generated by said average value circuitry above the average value of said input data signal, creating an offset average value signal connected to the inverting terminal of said comparator.

11. The Gigabaud Link Module of claim 10 wherein said peak detection circuitry comprises:

a first resistor and a first diode connected in series between the input data signal and the non-inverting terminal of said comparator;

a first capacitor connected between the non-inverting terminal of said comparator and ground; and a second resistor connected between the non-inverting terminal of said comparator and ground, in parallel with said first capacitor.

12. The Gigabaud Link Module of claim 10 wherein said average value circuitry comprises:

a third resistor and a second diode connected in series between the input data signal and the inverting terminal of said comparator;

a fourth resistor connected between the inverting terminal of said comparator and ground; and a second capacitor connected between said third resistor and second diode and ground.

13. The Gigabaud Link Module of claim 12 wherein said offset voltage circuitry comprises a fifth resistor connected between said third resistor and second diode and a dc power supply having an output voltage greater than the average value of said input data signal.

14. A Gigabaud Link Module providing an L_UNTUSE signal to a host device associated with said Gigabaud Link Module, said L_UNUSE signal providing indication that the Gigabaud Link Module is under power, ready for operation, is not running a diagnostic test and is receiving a data signal over a receive data link, the Gigabaud Link Module comprising:

signal detection circuitry configured to detect the presence of a data signal on said receive data data link and generate a Signal Detected signal; and logic circuitry configured to produce said L_UNUSE signal, said Signal Detected signal being an input to the L_UNUSE logic circuitry.

15. The Gigabaud Link Module of claim 14 wherein said signal detection circuitry comprises:

a reverse biased photodiode and a first resistor connected in series between a supply voltage and ground, said photodiode being positioned such that optical radiation transmitted over said optical fiber strikes said photodiode modulating a reverse current flowing theretrough, said reverse current causing a first voltage drop across said first resistor;

second and third resistors connected in series between said supply voltage and ground, said second and third resistors forming a voltage divider and establishing a reference voltage therebetween, wherein said power threshold for determining the presence of said optical radiation is established by said reference voltage;

a comparator for comparing said first voltage drop against said reference voltage, said comparator having an output dependent on the voltage difference between said first voltage drop and said reference voltage; and an output stage for developing the Signal Detected signal, said output stage being driven by said comparator output.

16. The Gigabaud Link Module of claim 15 wherein the L_UNUSE logic circuitry comprises:

a reset logical input, driven by a reset signal indicating the operational status of the Gigabaud Link Module;

a test enable logical input, indicating when a diagnostic test function has been initiated within the Gigabaud Link Module;

a signal detected logical input driven by the Signal Detected signal generated by the signal detected circuitry; and a plurality of logic gates configured to produce a L_UNUSE logical output signal, the L_UNUSE signal being set to a logic true state for all logical combinations of said reset, test enable, and signal detected inputs, other than the combination where the reset input is logically true, the test enable input is logically false, and the signal detected input is logically true, in which case the L_UNUSE signal is set to a logically false state.

* * * * *

UNITED STATES PATENT AND TRADEMARK OFFICE
Certificate

Patent No. 5,969,841                                                      Patented: October 19, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Patrick B. Gilliland, Chicago, Illinois.

Signed and Sealed this Twenty-Ninth Day of February, 2000.

JASON CHAN
*Supervisory Patent Examiner*
Art Unit 2733

UNITED STATES PATENT AND TRADEMARK OFFICE
CERTIFICATE OF CORRECTION

PATENT NO. : 5,969,841
DATED : October 19, 1999
INVENTOR(S) : James W. McGinley, et. al.

It is certified that error appears in the above-identified patent and that said Letters Patent is hereby corrected as shown below:

The Title page, should be deleted and substitute therefor the attached Title page.

Drawings:

Delete Drawing Sheets 1-5 and substitute therefor the Drawing Sheets, consisting of Figs. 1-5, as shown on the attached pages.

United States Patent [19]

McGinley et al.

[11] Patent Number: 5,969,841
[45] Date of Patent: Oct. 19, 1999

[54] GIGABAUD LINK MODULE WITH RECEIVED POWER DETECT SIGNAL

[75] Inventors: James W. McGinley, Schaumburg; Patrick B. Gilliland, Chicago, both of Ill.

[73] Assignee: Methode Electronics, Inc., Chicago, Ill.

[21] Appl. No.: 08/821,134

[22] Filed: Mar. 20, 1997

[51] Int. Cl.[6] .................................................. H04B 10/00
[52] U.S. Cl. ........................ 359/163; 359/152; 359/110
[58] Field of Search ............................ 395/651; 370/464, 370/466; 359/158, 163, 127, 110, 152, 143

[56] References Cited

U.S. PATENT DOCUMENTS

| | | | |
|---|---|---|---|
| 4,908,823 | 3/1990 | Haagens et al. | 370/85 |
| 5,069,522 | 12/1991 | Block et al. | 385/39 |
| 5,253,249 | 10/1993 | Fitzgerald et al. | 370/24 |
| 5,727,207 | 3/1998 | Gates et al. | 395/651 |
| 5,727,218 | 3/1998 | Hotchkin | 395/733 |

OTHER PUBLICATIONS

GLM Family Physical, Electrical, & Link Level Specification FCSI–301–Revision 1.0.
Coughlin and Driscoll, Operational Amplifiers and Linear Integrated Circuits, pp. 51, 52, 53 74, 76, 118, 180 and 181, 1991.

*Primary Examiner*—Kinfe-Michael Negash
*Attorney, Agent, or Firm*—David L. Newman

[57] ABSTRACT

An improved Gigabaud Link Module (GLM) is provided for performing bi-directional data transfers between a host device and a serial transfer medium. The improved GLM, includes data signal transmission circuitry for reading data signals from the host device and transmitting the data signals as serial data over a first serial transfer link. Data signal receiving circuitry is also provided for receiving serial data signals from a second serial transfer link. The receiving circuitry then writes the signals to the host device. The first and second transfer links form the serial transfer medium, and the transmission and receiving circuitry provides the bi-directional data transfer between the host device and the serial transfer medium. The improved GLM further includes signal detection circuitry for determining when data signals are being received over the second serial transfer link.

16 Claims, 5 Drawing Sheets

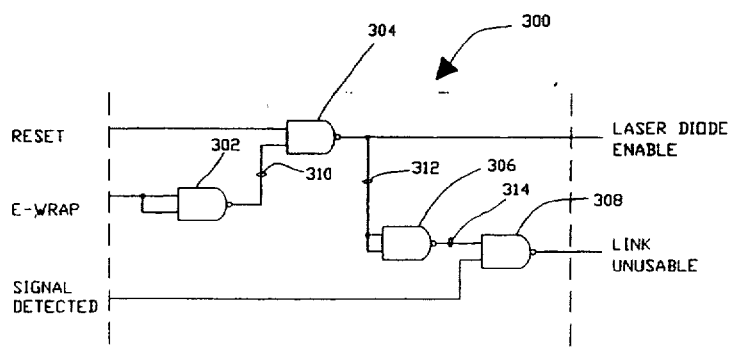

UNITED STATES PATENT AND TRADEMARK OFFICE
CERTIFICATE OF CORRECTION

PATENT NO : 5,969,841
DATED : October 19, 1999
INVENTOR(S): McGinley, et al.

Page 3 of 8

It is certified that error appears in the above-identified patent and that said Letters Patent is hereby corrected as shown below:

Replace Figure 1 of Sheet 1 of 5 with Figure 1 shown below.

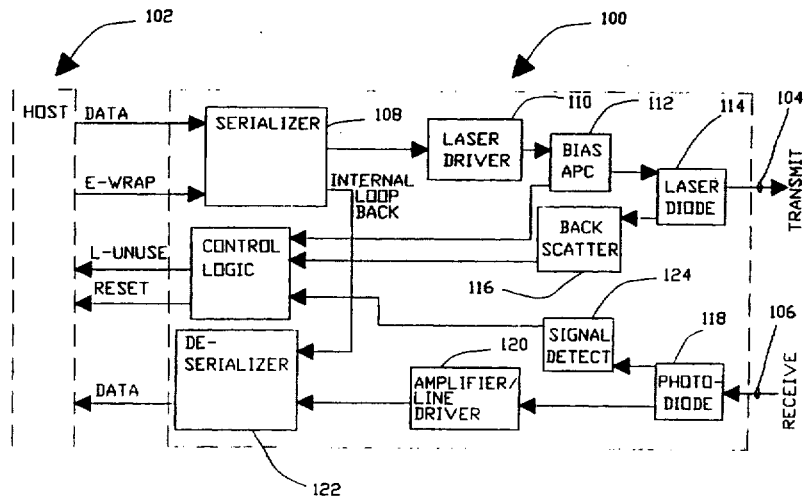

Fig. 1

UNITED STATES PATENT AND TRADEMARK OFFICE
CERTIFICATE OF CORRECTION

PATENT NO : 5,969,841
DATED : October 19, 1999
INVENTOR(S): McGinley, et al.

Page 4 of 8

It is certified that error appears in the above-identified patent and that said Letters Patent is hereby corrected as shown below:

Replace Figure 2 of Sheet 2 of 5 with Figure 2 shown below.

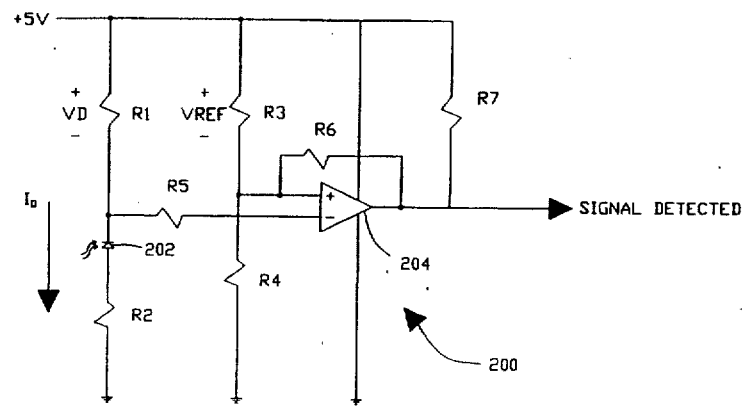

Fig. 2

UNITED STATES PATENT AND TRADEMARK OFFICE
CERTIFICATE OF CORRECTION

PATENT NO : 5,969,841

DATED : October 19, 1999

INVENTOR(S): McGinley, et al.

It is certified that error appears in the above-identified patent and that said Letters Patent is hereby corrected as shown below:

Replace Figure 3 of Sheet 3 of 5 with Figure 3 shown below.

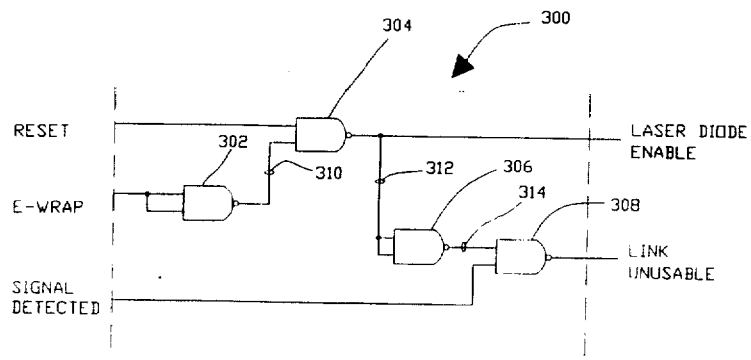

Fig. 3

UNITED STATES PATENT AND TRADEMARK OFFICE
CERTIFICATE OF CORRECTION

PATENT NO : 5,969,841            Page 6 of 8
DATED     : October 19, 1999
INVENTOR(S): McGinley, et al.

It is certified that error appears in the above-identified patent and that said Letters Patent is hereby corrected as shown below:

Replace Figure 4 of Sheet 4 of 5 with Figure 4 shown below.

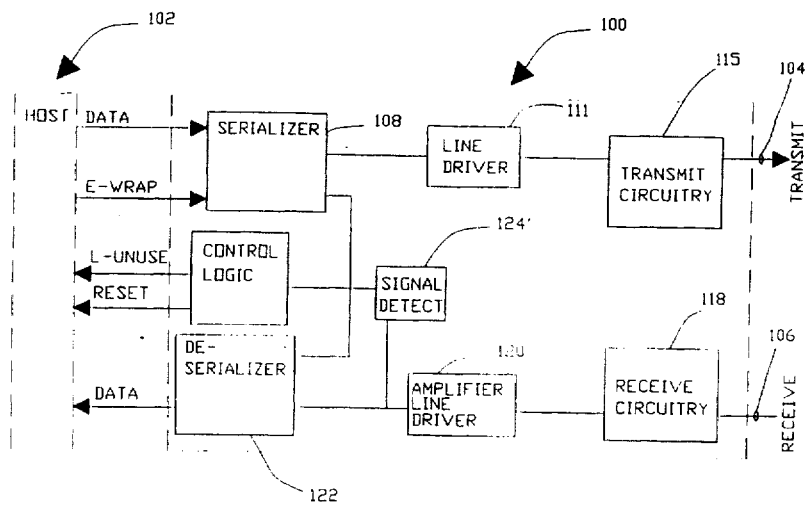

Fig. 4

UNITED STATES PATENT AND TRADEMARK OFFICE
CERTIFICATE OF CORRECTION

PATENT NO : 5,969,841
DATED : October 19, 1999
INVENTOR(S): McGinley, et al.

It is certified that error appears in the above-identified patent and that said Letters Patent is hereby corrected as shown below:

Replace Figure 5 of Sheet 5 of 5 with Figure 5 shown below.

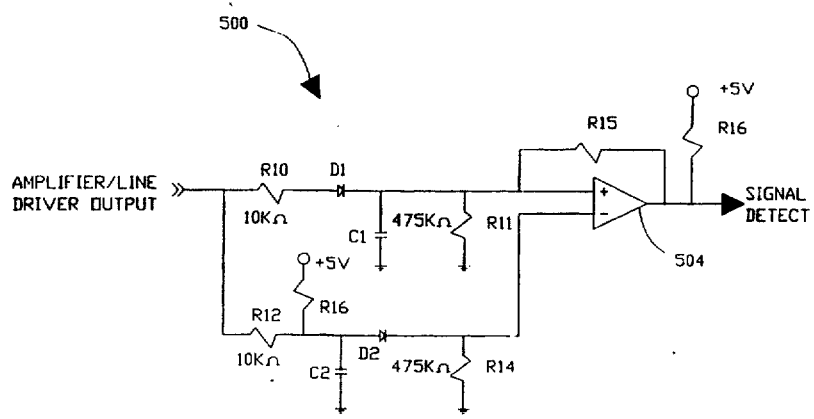

Fig. 5

UNITED STATES PATENT AND TRADEMARK OFFICE
CERTIFICATE OF CORRECTION

PATENT NO : 5,969,841
DATED : October 19, 1999
INVENTOR(S): McGinley, et al.

It is certified that error appears in the above-identified patent and that said Letters Patent is hereby corrected as shown below:

Claim 14, line 1, change "L_UNTUSE" to --L_UNUSE--.

Signed and Sealed this

Eighteenth Day of July, 2000

Attest:

Q. TODD DICKINSON

*Attesting Officer*   *Director of Patents and Trademarks*